United States Patent [19]
Philippson et al.

[11] 3,758,523
[45] Sept. 11, 1973

[54] PROCESS FOR THE PREPARATION OF DELTA 4-3-OXO-1-ALPHA-METHYL STEROIDS

[75] Inventors: Rainer Philippson, Bergkamen; Emanuel Kaspar, Kamen, both of Germany

[73] Assignee: Schering A.G., Berlin and Bergkamen, Germany

[22] Filed: Sept. 10, 1971

[21] Appl. No.: 179,537

[30] Foreign Application Priority Data
Sept. 14, 1970 Germany.................. P 20 46 640.4

[52] U.S. Cl....... 260/397.3, 260/397.4, 260/397.45, 424/243
[51] Int. Cl............................................ C07c 169/20
[58] Field of Search................ Machine Steroids Primary Examiner—Elbert L. Roberts
Attorney—I. William Millen et al.

[57] ABSTRACT

$\Delta^4$-3-Oxo-1$\alpha$-methyl steroids are produced by the reaction of $\Delta^{1,4}$-3-oxo steroids with dimethyllithium copper.

5 Claims, No Drawings

PROCESS FOR THE PREPARATION OF DELTA 4-3-OXO-1-ALPHA-METHYL STEROIDS

BACKGROUND OF THE INVENTION

This invention relates to a process for the preparation of $\Delta^4$-3-oxo-1α-methyl steroids.

It is known that $\Delta^4$-3-oxo-1α-methyl steroids can be produced from $\Delta^{1,4}$-3-oxo steroids by halogenation with N-bromosuccinimide; reductive removal of the halogen from the thus-produced 6-halo steroid with zinc; treatment of the thus-obtained $\Delta^{1,5}$-3-oxo steroid with methylmagnesium halide in a Grignard reaction; and rearrangement of the $\Delta^5$-double bond into a $\Delta^4$-double bond by treatment with acid. (German Patent 1,223,837) However, such processes require several stages and thus are expensive and time-consuming for the commercial production of $\Delta^4$-3-oxo-1α-methyl steroids.

Accordingly, it is an object of this invention to provide an improved process for the preparation of 1α-methyl-$\Delta^4$-3-oxo steroids requiring fewer reaction steps. Other objects will be apparent to those skilled in the art to which this invention pertains.

SUMMARY OF THE INVENTION

According to this invention, $\Delta^4$-3-oxo-1α-methyl steroids are produced by reacting the corresponding $\Delta^{1,4}$-3-oxo steroids with dimethyllithium copper.

The process of this invention has the advantage over the prior art that a 1α-methyl group can be introduced in a single reaction step into a steroid having a $\Delta^{1,4}$-3-oxo group.

DETAILED DISCUSSION

Methylation reactions with dimethyllithium copper are conventional. For example, trans-4,10-dimethyl-2-oxo-2,3,4,5,6,7,8,10-octahydronaphthylene is produced by methylating 10-methyl-2-oxo-2,5,6,7,8,10hexahydro naphthylene (Tetrahydron Letters 1969, 1387). However, when conducting this reaction with compounds further substituted on a ring which is condensed onto the dienone ring system, in the great majority of cases the corresponding cismethyl compound is produced, as was demonstrated by these authors using 6,10-dimethylene -2-oxo-2,5,6,7,8,10-hexahydronaphthylene. It was therefore surprising that with the starting materials employed in the process of this invention, in which the ring condensed onto the dienone system is more highly substituted, only the corresponding trans-methyl compound is produced. This is particularly surprising because the methylation could also theoretically occur on the C-5 carbon atom, according to Pfister and Ireland (Tetrahydron Letters 1969, 2145), who teach that 5-methyl-5β-cholesten-3-one is produced by the reaction of 4-cholesten-3-one with dimethyllithium copper.

The $\Delta^{1,4}$-3-oxo steroids utilized as the starting materials for this process can be substituted with one or more groups conventional in steroid chemistry without this substitution having an adverse effect on the process of this invention. For example, the steroid nucleus can contain an alkyl group in the 7,16- and/or 18-position, an alkylene group in the 15,16-, 16-, or 16,17-position; a halogen atom, e.g., fluorine or chlorine, in the 6-, 9-, and/or 16-position; a keto group in the 17- and/or 11-position; and a free or functionally modified hydroxyl group in the 11- or 16-position. The hydroxyl groups can be etherified or esterified with an acyl residue. In addition to the double bonds in the A-ring, double bonds can also be present elsewhere in the molecule, such as, for example, $\Delta^6$-, $\Delta^{9(11)}$-, or $\Delta^{16}$-double bonds, as long as they are not conjugated with a keto group.

Preferred starting compounds for the process of this invention are $\Delta^{1,4}$-3-oxo steroids of the androstane and pregnane series of the general formula

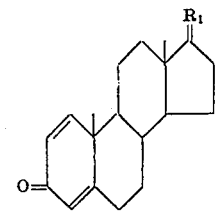

wherein $R_1$ is =O, =CH—CH$_3$,

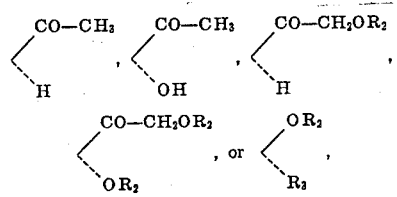

$R_2$ being hydrogen or the acyl radical of an organic carboxylic acid and $R_3$ being hydrogen or lower alkyl.

Examples of acyl radicals are all those of acids employed in steroid chemistry in esterification processes. Preferred acids are those containing up to 15 carbon atoms, particularly lower (one to eight carbon atoms) and intermediate (eight to 12 carbon atoms) aliphatic carboxylic acids. These acids can be saturated or unsaturated, straight or branched, chain, mono-, di- or polybasic, unsubstituted or substituted, for example, by hydroxyl, an amino group or one or more halogen atoms. Suitable are also cycloaliphatic, aromatic, mixed aromatic-aliphatic, or heterocyclic acids which can likewise be substituted in the ordinary manner. Examples of preferred acyl groups are those of alkanoic acids, e.g., acetic acid, propionic acid, caproic acid, enanthic acid, undecylic acid, alkenoic acids, e.g., oleic acid, trimethylacetic acid, haloacetic acids, e.g., chloroacetic acid, cyclopentylpropionic acid, phenylpropionic acid, phenylacetic acid, phenoxyacetic acid, dialkylaminoacetic acids, e.g., dimethylaminoacetic acid, piperidinoacetic acid, succinic acid, benzoic acid, etc.

The preferred starting compounds of the above structural formula are converted in the process of this invention into the corresponding $\Delta^4$-3-oxo-1α-methyl steroids of the general formula

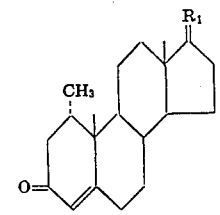

wherein $R_1$ has the values given above.

Specific examples of $\Delta^4$-3-oxo-1α-methyl steroids produced by the process of this invention from the corresponding $\Delta^{1,4}$-3-oxo steroids are 1α-methyl-testosterone 17-acetate and esters of the other acids named above. 1α, 17α-dimethyl-testosterone, 1α, 6, 17α-trimethyl-testosterone, 1α, 17α, 18-trimethyl testosterone, 1α-methyl-6α-fluoro-testosterone acetate, 1α, 17α-dimethyl-6α-fluoro-testosterone, 1α-methyl-hydrocortisone acetate, 1α-methyl-9α-fluoro-hydrocortisone acetate and 1α, 16α-dimethyl-9α-fluoro-hydrocortisone acetate.

The $\Delta^4$-3-oxo-1α-methyl steroids prepared by the process of this invention are themselves valuable pharmacologically active compounds or they can be employed as intermediates for the preparation of such compounds. They exhibit the same general pharmacological properties as the corresponding 1-desmethyl steroids, but often with a substantially increased effectiveness.

For example, the $\Delta^4$-3-oxo -1α-methyl steroids of the androstane series prepared according to the process of this invention exhibit, in addition to an androgenic activity which in most cases is substantially less than the corresponding 1-desmethyl steroids, very high anabolic activity. Steroids of the pregnane series produced by the process of this invention, particularly those possessing the side chain characteristic of corticoids, possess high anti-inflammatory activity together with minor sodium retention.

The process of this invention is preferably conducted by adding a solution of the starting $\Delta^{1,4}$-3-oxo steroid in an inert solvent to a solution of the dimethyllithium copper, in the same or different inert solvent. The dimethyllithium copper can be prepared in a conventional manner. See J. Org. Chem. 17, 1630 (1952).

Preferred as inert reaction solvent is diethyl ether.

Others are methylene chloride, tetrahyhydrofuran and dioxane.

The ratio of reactants is not critical. However, for highest yields and product of highest purity, the ratio is 1 to 3 molar equivalents of dimethyllithium copper calculated on the starting steroid.

The reaction is preferably conducted initially below room temperature, e.g., −40°C preferably about −5° to 0°C. Thereafter, the reaction temperature is preferably allowed to rise to at least about room temperature to ensure complete reaction.

The thus-produced $\Delta^4$-3-oxo-1α-methyl steroid can then be isolated in the conventional manner, e.g., separating the inorganics, chromatographing the organic product followed, if necessary, by fractional crystallization.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

Under a nitrogen atmosphere and with agitation, 1.14 g. of 1,4-androstadiene-3,17-dione in 100 ml. of ether is gradually added dropwise at −5° to 0° C. to a solution of dimethyllithium copper prepared from 1.52 g. of copper (I) iodide in 90 ml. of ether and 352 mg. of methyllithium in 17.5 ml. of ether. The reaction mixture is stirred for another 30 minutes. Then, the mixture is allowed to warm up to room temperature. Saturated ammonium chloride solution is added and the reaction mixture is stirred for 30 minutes. Thereafter, methylene chloride is added and the organic phase separated, washed with water, dried and evaporated to dryness under reduced pressure. The thus-obtained crude product is subjected to preliminary purification by preparative layer chromatography (cyclohexane/ethyl acetate, 7:3) and then recrystallized from methanol and isopropyl ether, thus yielding 0.67 g. of 1α-methyl-4-androstene-3,17-dione, m.p. 147°–148° C.

EXAMPLE 2

Under a nitrogen atmosphere and with agitation, 3.7 g. of 17β-hydroxy-1,4-androstadien-3-one in 30 ml. of tetrahydrofuran is added dropwise at 0° C. to a dimethyllithium copper solution prepared from 4.9 g. of copper (I) iodide in 50 ml. of ether and 62 ml. of methyllithium ether solution (18.4 mg./ml.). The mixture is stirred for another 30 minutes. After working the reaction mixture up in analogy to Example 1, 1.1 g. of 17-β-hydroxy-1α-methyl-4-androsten-3-one is obtained, m.p. 190°–191° C.

EXAMPLE 3

1.32 g. of 17β-acetoxy-1,4-androstadien-3-one is added to a dimethyllithium copper solution prepared from 1.52 g. of copper(I) iodide and 352 mg. of methyllithium in ether. The mixture is reacted and worked up analogously to Example 1. After recrystallization from isopropyl ether, 0.36 g. of 17β-acetoxy-1α-methyl-4-androsten-3-one is obtained, m.p. 140° C.

EXAMPLE 4

1.2 g. of 17β-hydroxy-17α-methyl-1,4-androstadien-3-one is added to a dimethyllithium copper solution prepared from 1.52 g. of copper (I) iodide and 352 mg. of methyllithium in ether. The mixture is reacted and worked up in analogy to Example 1. After recrystallization from isopropyl ether, 0.47 g. of 17β-hydroxy-1α,17α-dimethyl-4-androsten-3-one is obtained, m.p. 175°–176° C.

EXAMPLE 5

Under vigorous agitation at −2° C., a solution of 0.735 g. of 17α-acetoxy-1,4,6-pregnatriene-3,20-dione in 3o ml of dioxane is added dropwise within 1.5 hours to a solution of dimethyllithium copper prepared from 0.76 g. of copper(I) iodide and 0.17 g. of methyllithium in ether. After conducting a working-up step and a preliminary purification analogously to Example 1, the reaction product is recrystallized from isopropyl ether, thus obtaining 0.44 g. of 17-acetoxy-1α-methyl-4,6-pregnadiene-3,20-dione, m.p. 214°–215° C. (UV: $\epsilon_{286}$ = 26,700)

EXAMPLE 6

Within 1.5 hours, under vigorous agitation and cooling, 5.12 g. of 1,4-androstadiene-3,17-dione in 30 ml. of methylene chloride is added dropwise to a solution of dimethyllithium copper prepared by suspending 7.5 g. of copper (I) iodide in methylene chloride and adding thereto dropwise ethereal methyllithium solution. The reaction mixture is additionally stirred for 1.5 hours. Thereafter, saturated ammonium chloride solution is added, and the mixture is stirred for 30 minutes.

Then the organic phase is separated, washed with water, dried over sodium sulfate, and evaporated to dryness under reduced pressure. After recrystallizing the crude product from toluene, 4.0 g. of 1α-methyl-4-androstene-3,17-dione is obtained, m.p. 147°–148° C.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the production of Δ⁴-3-oxo-1α-methyl steroids which comprises reacting a corresponding Δ¹,⁴-3-oxo steroid of the androstane or pregnane series with dimethyllithium copper.

2. A process according to claim 1 wherein the reaction is initially conducted at below room temperature.

3. A process according to claim 1 wherein the starting Δ¹,⁴-3-oxo steroid is a compound of the general formula

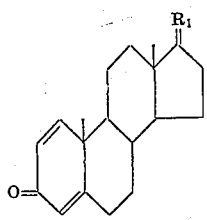

wherein $R_1$ is =O, =CH—CH$_3$,

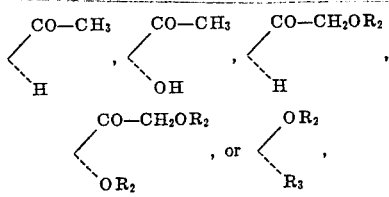

in which $R_2$ is hydrogen or the acyl radical of an organic carboxylic acid and $R_3$ is hydrogen or lower-alkyl.

4. A process according to claim 3 wherein the Δ⁴-3-oxo-1α-methyl steroid corresponds to a product selected from the group consisting of 1α-methyl-testosterone 17-acetate, 1α, 17α-di-methyl-testosterone 1α, 6, 17α-trimethyl-testosterone, 1α, 17α 18-trimethyl testosterone, 1α-methyl-6α-fluoro-testosterone acetate, 1α17α-dimethyl-6α-fluoro-testosterone, 1α-methylhydrocortisone acetate, 1α-methyl-9α-fluoro-hydrocortisone acetate and 1α, 16α-dimethyl-9α-fluoro-hydrocortisone acetate.

5. A process according to claim 4 wherein the reaction is initially conducted at below room temperature.

* * * * *